Oct. 8, 1957  S. REINER ET AL  2,808,826
ELECTRO-DIAGNOSTIC APPARATUS AND A CIRCUIT THEREFOR
Filed Jan. 19, 1956
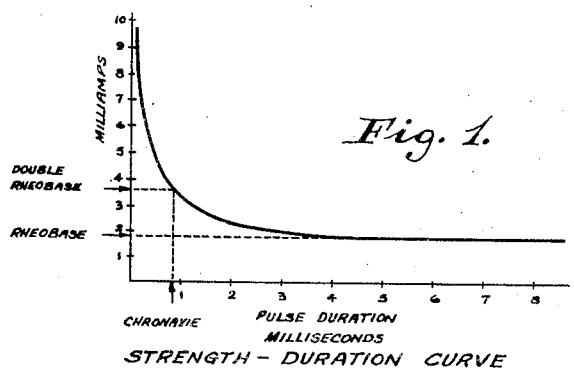
STRENGTH - DURATION CURVE
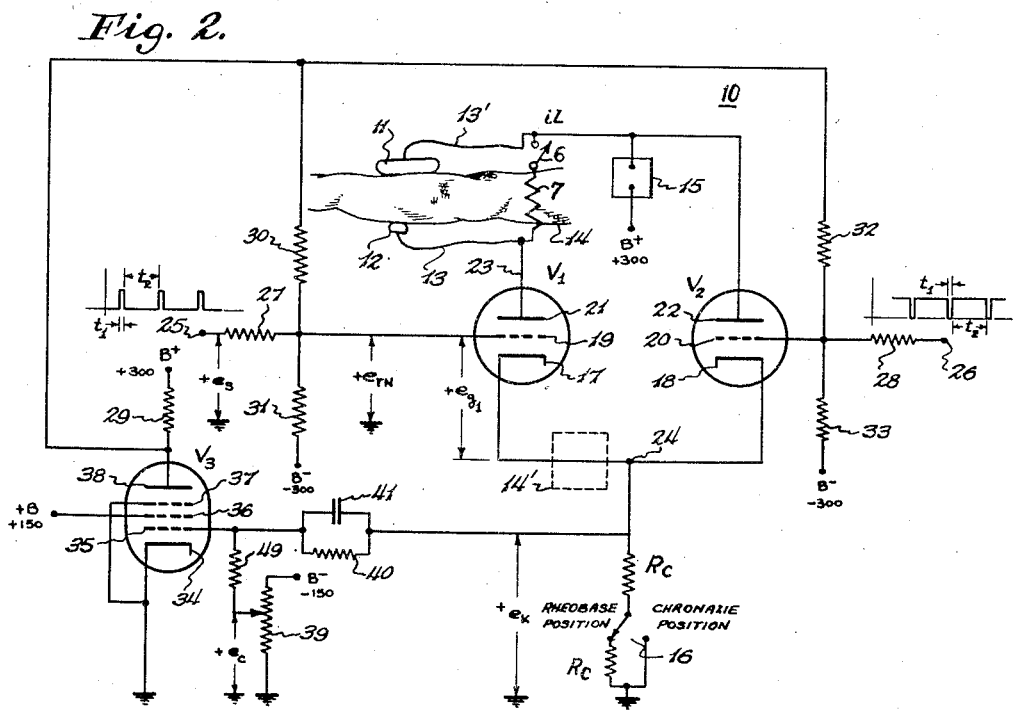
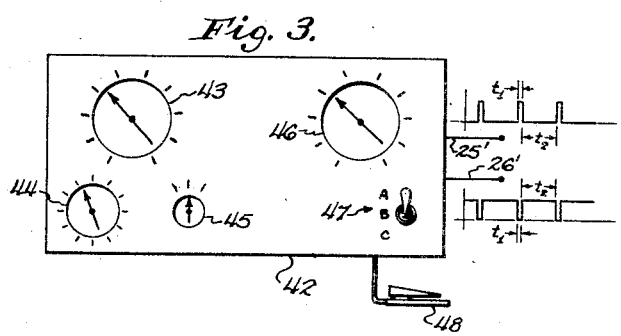
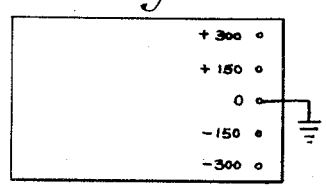
INVENTORS
STUART REINER
DAVID C. HUGHES
BY
ATTORNEY

United States Patent Office 2,808,826
Patented Oct. 8, 1957

2,808,826

ELECTRO-DIAGNOSTIC APPARATUS AND A CIRCUIT THEREFOR

Stuart Reiner, White Plains, and David Colson Hughes, New York, N. Y., assignors to Teca Corporation, White Plains, N. Y., a corporation of New York Application January 19, 1956, Serial No. 560,119

19 Claims. (Cl. 128—2.1)

This invention relates to a pulse generator capable of generating accurate electrical pulses controllable and measurable in current amplitude and adjustable in repetition and duration, and in particular, the invention relates to an electrical stimulator adaptable for measuring the excitability of muscle and/or associated nerve tissue.

In instant application is a continuation-in-part of our copending application Serial No. 440,116, filed June 29, 1954, for Electro-Diagnostic Apparatus and a Circuit Therefor, but now abandoned.

It is known that muscle tissues of a person respond in a certain manner, such as by contractions, when stimulated by electrical impulses. Experience has shown that the stimulating impulses will, when applied in accordance with certain procedures, provide precise information impossible to obtain by other means. In diagnosing injured or diseased muscle or nerve tissues, it is often impossible or extremely difficult to learn anything of the injured or diseased tissue except by comparing its response to electrical tests to published normals for such electrical tests or to the response of healthy tissue to similar electrical tests. This comparison test or examination not only helps the physician locate the area of the injured or diseased tissue, but also serves in the diagnosis of the extent of the injury, and in establishing prognosis.

The electrodiagnostic pulse generator is used by the physician as the source of currents to be applied to the patient under examination. It also serves as the metering or measuring instrument in the diagnosis of injured or diseased tissue. Actually the device is a pulse generator, the output currents of which are applied to the tissue under examination. For certain values of current amplitude and pulse durations, the nerve or muscle tissue will respond by contractions visible to the eye. Consequently, the electrodiagnostic generator, hereinafter referred to as a stimulator, must produce pulses of current which are controllable in duration and amplitude.

To serve as an instrument for electrodiagnosis, the stimulator should be capable of generating pulses of accurate duration from fractions of milliseconds to hundreds of milliseconds. Moreover, duration, wave shape and amplitude of the generated pulses should be independent of spurious load variations to provide reliable operation. This strict requirement is important because accurate clinical work requires comparisons of repeated electrodiagnostic tests. Spurious load variations are caused by variations of the patient's resistance and capacitance. Further variations may be traced to variations in electrode dampness and pressure; the electrode referred to is the terminal of the output leads of the stimulator by which connection to the patient is made. These spurious load variations have to be neutralized or cancelled; otherwise they will cause the wave shape and the amplitude of the current pulse to vary for a given patient under test and from patient to patient. Control of wave shape, amplitude and pulse duration by a simple pentode type output circuit does not provide the necessary constancy over a wide enough range of operation to provide a reliable stimulator for clinical work.

Accordingly, it is a principal object of this invention to provide a pulse generator output circuit which will produce pulses of duration, wave shape and amplitude independent of spurious load variations. Essentially the circuit consists of a pair of output amplifier tubes connected in parallel relationship, with the patient load in plate circuit of one of the tubes. The tubes are energized for alternating operation by a pair of inverted pulse signals. A regulating circuit is provided which involves a feedback utilizing a third amplifier tube responsive to variations of the patient load; the output of the third tube is fed back to the control electrodes of the pair of tubes so that proper compensatory regulation is provided to neutralize the effects of the load variations.

To standardize electrodiagnostic procedures and to obtain the most meaningful results, certain test procedures based upon the electrophysiology of muscle and nerve tissue have been evolved and are described in the literature. The two tests that have achieved wide acceptance because they provide quantitative information are the determination of the strength duration curve and the determination of the chronaxie value. Both tests are based on the fact that muscle and nerve excitability is a function of both the amplitude and duration of the stimulating pulse. To perform a chronaxie determination, the muscle is first tested with pulses of extremely long duration 0.3 second or larger to establish the minimum quantity of current which will produce muscular response. This value of current is known as the rheobase. A short duration current pulse with an amplitude of exactly twice the rheobase value is then applied to the muscle. For extremely short pulses no response is seen. The duration of this pulse is then increased until muscular response is again noted. The minimum pulse duration for muscular response utilizing current pulses whose amplitude is twice the rheobase value is known as the chronaxie value. Chronaxie value is measured in milliseconds. For rapid clinical testing, the stimulator should be designed so that pulses of twice rheobase value are easily and quickly available, for example by a flick of a switch, once the rheobase has been determined.

It would be particularly desirable if the pulse current doubling were automatic; this relieves the physician of measuring the rheobase current and then setting and maintaining the output current of the pulse generator at twice this value for chronaxie determination. The elimination of two current readings and their attendant reading errors also adds to the accuracy of the results, especially when carried out as routine. The availability of simple automatic doubling also allows the operator to recheck easily and rapidly the rheobase muscle response, and to compare it to the chronaxie muscle response. For accurate results, the muscle response to the rheobase current should be the same as the muscle response to the chronaxie pulse.

Accordingly, it is a further object of this invention to provide a stimulator circuit which automatically doubles any rheobase current without requiring the operator to measure specifically this current, and also to provide circuit means whereby pulses of variable duration may be generated at peak currents equal to twice the rheobase current values. The essence of the automatic measurement of chronaxie value is a simple switching arrangement in the cathode circuit of the pair of parallel connected output tubes.

Another object of this invention is to provide a stimulator circuit which provides constant indication of the peak current value delivered to the patient at all times, even during stimulation. This indication must also be independent of variations of the electrical parameters of the patient load, such as, resistance, inductance and capacitance; further this indication should be steady and not subject to error as the pulse duration or rest period between pulses is varied. It is still a further object to provide a regulated or constant voltage across the patient terminals or load in the presence of load changes by insertion of a relatively low resistance across the load.

Another object of the invention is a stimulator circuit which provides accurate reproducible results.

These and further objects of the invention will become apparent upon consideration of the following description of a preferred embodiment of my invention in conjunction with the figures, in which:

Fig. 1 is a strength-duration graph for muscular or nerve tissue;

Fig. 2 is a simplified schematic diagram of the pulse output circuit of the invention;

Fig. 3 is a block diagram of the source of inverted pair of signals; and

Fig. 4 is a block diagram of the direct current source.

Stimulator 10 provides rectangular pulses of controlled dimensions in time and amplitude to allow the physician to determine the strength-duration curve (note Fig. 1) or chronaxie value for a muscle or associated nerve. The information made available to the physician by the shape of the strength-duration curve and/or the chronaxie value for a muscle, when compared with the shape of the strength-duration curve or the chronaxie value for a normal muscle, provides diagnostic information concerning the nature of the muscle and nerve injury or disease and its prognosis, as well as information concerning rehabilitation.

In the clinical determination of the strength-duration curve and the chronaxie value for a given muscle, the following procedure may be followed. Two connections must be made to the patient in order to provide a closed path for the stimulating current $i_L$. One connection is usually made with a flat metal electrode 11 a few square inches in area which is covered with some water absorbent cloth. Electrode 11, called the dispersive electrode, is moistened with water and held in close contact with the patient's skin by some holding means at some location on the body adjacent to the area to be studied.

Electrode 12, often referred to as the testing electrode or the exploring electrode, is constructed and moistened in a manner similar to dispersive electrode 11, but has an active area as small as ⅛ square inch and is provided with an insulating handle which is held by the operator. Electrode 12 is held in contact with the skin at a point directly over the muscle or nerve being tested. Both electrodes 11, 12 are connected to stimulator 10 by connecting wires 13, 13'.

Data for the strength-duration curve are obtained as follows: Pulses of extremely short duration (in the order of .05 millisecond) are applied to the patient by means of electrodes 11, 12. The amplitude of these pulses is slowly increased from zero up to a point where a visible contraction appears. This is called a minimal or threshold contraction. The peak value of pulse current required for a threshold contraction at this pulse duration is recorded. The pulse duration is then increased to a slightly longer value and again the peak pulse current required to produce a threshold muscle response is recorded. The pulse duration is then further increased in uniform steps, and the additional threshold currents are recorded. A curve of pulse duration vs. corresponding threshold currents is plotted. This is the strength-duration curve. A typical normal curve is shown in Figure 1. All points above and to the right of the curve represent combinations of pulse current amplitude and duration that result in a muscle contraction. All points below and to the left of the curve do not result in muscle contractions.

Determination of chronaxie value involves a shorter procedure and is actually a determination of two points of interest on the strength-duration curve. The first step is to determine the rheobase. The rheobase is actually the horizontal asymptote of the strength-duration curve; namely, the minimum current required for minimal contraction when the pulse duration is very long. From the shape of the curve it can be seen that this current is independent of pulse duration when duration is long. To find this rheobase current, we apply pulses of some long duration (0.3 second), that is pulses of duration well out on the horizontal portion of the curve and increase the amplitude until minimal muscle contraction is seen.

The next step is to apply pulses with very small pulse duration with amplitude exactly double the rheobase. The pulse duration is then steadily increased, keeping the peak current value exactly double the rheobase value, until a threshold muscle response is seen. The muscle contraction should be the same vigor for the rheobase response. This particular pulse duration at which the threshold response is seen is called the chronaxie value and has dimensions of time in milliseconds.

Fig. 2 illustrates a simple schematic diagram of the output circuit of pulse generator or stimulator 10. This circuit insures constant current and rectangular wave form pulses of current through the patient load 14. The circuit also provides a steady indication of peak current on a meter, such as direct current milliammeter 15, even when short duration pulses are being applied to patient 14. Automatic doubling of the rheobase current is effected when a double-throw, single-pole switch 16 is moved to chronaxie position.

The output circuit has a pair of output amplifier tubes $V_1$ and $V_2$ shown as triodes having respectively cathodes 17, 18, grids 19, 20 and anodes 21, 22. Plate 21 is connected to load electrode 12 by means of lead 13. The other load electrode 11 and plate 22 of tube $V_2$ are connected to one side of a direct current milliammeter 15. The other side of meter 15 is connected to a B+ plate voltage source. The patient, load 14, is inserted in the plate circuit of $V_1$. An alternate arrangement consists of locating load 14 between cathode 17 and junction 24 as illustrated by the dashed box 14'.

The control grids 19, 20 are connected to respective input terminals 25, 26 through series resistors 27, 28. A voltage divider network is provided between the source of positive direct current voltage B+ and a source of negative direct current voltage B−. The voltage divider consists of resistor 29 in series with a parallel combination of resistors 30, 31 and 32, 33. Grid 19 and one side of resistor 27 are connected to the junction of resistors 30, 31. The other side of resistor 31 is connected to the B− source. Grid 20 and one side of resistor 28 are connected to the junction of resistors 32, 33. The other side of resistor 33 is connected to the B− source.

Cathodes 17, 18 are connected to a ground terminal through two equal resistors $R_c$, $R_c$. A single-pole, double-throw switch 16 may be thrown from the rheobase position, as illustrated, to the chronaxie position so as to halve the resistance in the common cathode circuit of tubes $V_1$, $V_2$ by switching out the lower, single resistor $R_c$.

A third amplifier tube $V_3$ shown as a pentode has cathode 34, control grid 35, screen grid 36, suppressor grid 37 and anode 38. A source of positive direct current voltage B+ is connected through series resistor 29 to anode 38. Grid 37 and cathode 34 are connected to the common bus. Grid 35 is connected through resistor 49 to the variable arm of potentiometer 39. Potentiometer 39 in turn is connected between a negative bias D. C. source B− at one end and the common bus at the other end. Grid 35 is also connected to junction 24 through the parallel combination of resistor 40 and capacitance 41.

When the input pulses are turned off, the pulse generator is so arranged that terminal 26 remains at its peak positive value and the terminal 25 is at its least positive voltage. Therefore $V_1$ will be cut off and $V_2$ will conduct an amount of current equal to the peak pulse current as determined by potentiometer 39. Amplifier tube $V_3$ will conduct plate current through series resistance 29 in an amount determined by the setting of the potentiometer 39 which setting helps determine the negative bias applied to grid 35. The plate current drawn by amplifier $V_3$ affects the voltage drop across resistance 29 and thereby controls the voltage applied to the control grids 19, 20 of amplifiers $V_1$ and $V_2$, because resistance 29 is part of the aforementioned voltage divider.

In operation a pair of inverted signals of equal amplitude are applied to the input terminals 25 and 26. Accordingly tubes $V_1$ and $V_2$ are energized for alternate operation. The signal arriving at terminal 25 consists of positive voltage pulses of duration $t_1$, separated with a rest period $t_2$ between pulses. The signal arriving at terminal 26 consists of positive voltage pulses equal in amplitude to the positive pulses arriving at terminal 25 but of duration equal to $t_2$, the rest period between the pulses arriving at terminal 25. The rest interval between pulses arriving at terminal 26 is $t_1$, the duration of the pulse at terminal 25. The pulse sources are synchronized so that a positive pulse at one terminal occurs concurrently with a rest period of equal duration at the other terminal. A pair of pulses such as described are referred to herein as a pair of inverted signals.

When the positive pulse of voltage entering terminal 25 is applied to control grid 19, plate current $i_L$ is caused to flow in tube $V_1$ for the interval $t_1$. This current flows through milliammeter 15, load 14 and the two series connected cathode resistor $R_c$. Concurrently, the input pulse signal to terminal 26 is at rest; consequently $V_2$ is not conducting.

When the longer positive pulse of voltage is applied to control grid 20, plate current is caused to flow in $V_2$. This current also flows through the meter 15 and the two cathode resistors $R_c$. Simultaneously, the input pulse to terminal 25 is at rest; hence $V_1$ is not conducting.

Since the meter 15 is a D. C. milliammeter it will respond to and read the average values of the narrow pulse of current conducted by amplifier $V_1$ and the wide pulse of current conducted by amplifier $V_2$. If the two pulses are equal in amplitude, meter 15 provides a steady reading which is the peak value of current of both pulses, and consequently it will read the true peak value of the current pulse flowing through load 14. If the two pulses are unequal in amplitude, meter 15 will indicate an average current which is not a true indication of the peak current flowing through load 14. By applying a proper control means to the circuit, the long and short pulses of current through meter 15 may be held equal in amplitude. Consequently, the true value of current through load 14 may be read accurately from meter 15 regardless of the relative duration of the pulses or of their repetition rate. If the plate currents through both tubes are held equal to each other during $t_1$ and $t_2$ and both currents are fixed relative to an adjustable stable voltage $e_c$, not only will a correct meter reading be obtained but also the peak pulse current will be independent of spurious variations in the patient load 14, output tubes $V_1$ and $V_2$, and variations in the amplitude of the inverted timing pulses applied to terminals 25, 26.

The plate currents of the two tubes $V_1$, $V_2$ flow through the current sensitive element, i. e., two series cathode resistors $2R_c$. The voltage developed across this current sensitive element, designated as $e_k$ in Fig. 2, is applied to grid 35. Feedback operation maintains $e_k$ constant and equal to $e_c$ in the presence of spurious variations. For example, if for any reason the resistance of load 14 increases, the plate current of $V_1$ will in a corresponding manner tend to decrease. This tends to reduce the voltage applied to control grid 35 of $V_3$, causing its plate current to decrease. The resulting decrease in voltage drop across resistance 29 tends to make the control grid voltage of $V_1$ more positive, thereby tending to increase its plate current and thus cancelling the effect of the increase in resistance of load 14. On the other hand, a spurious decrease of load resistance is cancelled out by a compensatory drop of the positive control grid voltage to grid 19 provided by the feedback action. The compensatory effect also takes place if the pulse signals at 25, 26 are not equal in amplitude or if the characteristics of $V_1$ and $V_2$ change due to aging. Thus the current pulses through meter 15 due to alternate conduction of $V_1$ and $V_2$ remain equal in amplitude and meter 15 reads correctly the true load current. The described regulation occurs instantaneously. The same regulating means that maintains the voltage $e_k$ constant will at the same time compensate for capacitance in the patient load circuit. Patient capacitance causes the current in $V_1$ to overshoot at the initiation of $t_1$. The overshoot of current in $V_1$ tends to cause $e_k$ to suddenly rise at the start of $t_1$. A rise of $e_k$ causes a substantially instantaneous compensating bias to be applied to the grid 19.

The current applied to the patient, plate current $i_L$, may be varied from a maximum patient current to zero patient current by corresponding settings of the arm of potentiometer 39. Potentiometer 39 contributes to the value of grid bias applied to tube $V_3$. Setting the arm of potentiometer to its top point produces the maximum negative bias. Consequently, the potential at plate 38 of $V_3$ is close to B+. This causes grids 19, 20 to be most positive upon conduction of $V_1$ and $V_2$ and the result is maximum patient current.

When the arm of potentiometer 39 is set to its low point, near ground, the negative bias is reduced to a minimum and tube $V_3$ conducts heavily and its plate and its plate voltage is low. This causes the grids 19, 20 to remain below cutoff even during the time that the input pulses at terminals 25, 26 are most positive and as a result there is zero patient current.

The preceding description of operation of the output circuit of stimulator 10 may be explained further by the following analysis in which relations between the changes in the input and output voltages are examined. The voltage $e_k$ developed across the cathode resistance of $V_1$, $V_2$ ($2R_c$ when switch is in rheobase position) is given by:

$$e_k = K_1 \times e_{g1} \qquad (1)$$

where $K_1$ is the voltage gain of the amplifier $V_1$ from its grid to cathode having a load of $2R_c$ and a grid signal $e_{g1}$ applied directly between its control grid 19 and cathode 17.

Further, $$e_{in} = e_{g1} + e_k \qquad (2)$$

where $e_{in}$ is the voltage between the control grid 19 of amplifier $V_1$ and ground but, $e_{in}$ is also given by:

$$e_{in} = K_3(e_c + e_k) + e_s \qquad (3)$$

where $K_3$ is the gain of the amplifier $V_3$ between its control grid 35 and the control grid 19 of amplifier $V_1$, $e_c$ is the command signal voltage determined by the setting of potentiometer 39, and $e_s$ is the signal amplitude of the input pulse at terminal 25, that is, the voltage of the input pulse above that required to cause the initiation of current flow in $V_1$. Combining these equations there results:

$$e_k = \frac{K_3 e_c}{1 + \frac{1}{K_1} - K_3} + \frac{e_c}{1 + \frac{1}{K} = K_3} \qquad (4)$$

Since $K_1$ is normally larger than unity and since $K_3$, the pentode gain, is very much larger than $K_1$, i.e., $K_1 \geqslant 1$ and $K_3 \gg 1$, Equation 4 reduces to the following approximation:

$$e_k = -\frac{K_3 e_c}{K_3} + \frac{e_c}{K_1} \qquad (5)$$

or for changes in voltages the following relation holds:

$$\Delta e_k = \Delta e_c + \frac{\Delta e_s}{K_3} \quad (6)$$

Since $K_3$ is normally very much larger than one, Equation 6 reduces to the following approximation:

$$\Delta e_k = \Delta e_c \quad (7)$$

Variation of $e_k$, that is $\Delta e_k$, is independent of changes in the peak value of the input pulses $e_s$. Thus $e_k$ is maintained equal to $e_c$; the latter is derived from a regulated source and is adjusted by the operator to give the desired meter readings. The foregoing analysis considers the relationship between $e_s$, $e_c$, $K_1$ and $K_3$. The remaining parameters, the B+ and B— voltages were ignored because they are constants. Since the load current $i_L$ is equal to $e_k/2R_c$, it is seen that:

$$i_L = \text{constant} \ xe_c \quad (8)$$

Thus, the plate current of $V_1$ is equal to that of $V_2$ regardless of the value of the load 14, and the meter 15 correctly reads the load current. To vary the load pulse current, $e_c$ is adjusted.

Once the rheobase value of current is determined, a test pulse double this value for finding the chronaxie is easily set by merely throwing the switch 16 to the ground position. This changes the value of the cathode resistance of $V_1$ and $V_2$ from $2R_c$ to $R_c$. Since the value of $e_k$ depends only on $e_c$, which is unchanged, the current through the cathode resistance must double because $e_k$ remains constant. The amplitude of the load current is thereby automatically doubled by changing the position of switch 16. It is thus seen that upon the simple flip of a switch 16, the operator of stimulator 10 may determine the chronaxie value of the patient, or recheck the rheobase.

Fig. 3 illustrates a pulse generator 42 with so-called balanced or symmetrical outputs 25' and 26'. These outputs are connected respectively to terminals 25, 26. Pulse generator 42 may be made up of any of many well-known circuits. Its characteristics are as follows. It generates pulses of duration $t_1$ which is adjustable from 0.1 to 1.0 millisecond in 10 steps on dial 43. A vernier dial 44 is provided also with 10 steps which can be used to vary the pulse duration in 10 equal increments within the major steps of dial 43. A multiplier dial 45 is provided which multiplies the settings on dials 43 and 44 by factors of 1, 10, and 100. The rest period $t_2$ is adjustable by dial 46 to ten values: 1, 5, 12, 25, 50 milliseconds, .1, .25, .5, 1, and 2 seconds. An eleventh position of this dial converts the pulse generator from a free-running pulse generator to a single-shot generator and which generates one pulse only of duration set on the duration dials every time switch 47 is thrown to the "manual" position or every time the foot switch is depressed when switch 47 is in the "foot switch" position.

Switch 47 has three positions labeled "repetitive pulse" $a$, "foot switch" $b$ and "manual" $c$. In the "repetitive pulse" position $a$, the pulse generator is turned on. In the "foot switch" position $b$, the pulse generator is off except when the foot switch 48 is depressed. The "manual" position $c$ is a spring return position and holds the pulse generator on as long as the switch is held in this position.

Fig. 4 is a power supply containing conventional gas tube regulators, and providing +300 volts, +180 volts, —150 volts, and —300 volts D. C. The common bus or ground is zero volts from which the other positive and negative voltages hereinbefore identified are referenced.

By inserting a relatively low resistance 7 across patient load 14, means are provided by which the voltage across load 14 can be regulated or otherwise maintained substantially constant in the presence of load changes. This technique may be used to measure responses to voltage pulses in high resistance patient loads. The resistance of resistor 7 should be low compared to the patient resistance, at least in the order of 10:1. Resistance 7 is inserted into the circuit by closing switch 6. Current through resistance 7 will be controlled as before. Therefore, the voltage across 7 also will be controlled and meter 15 may be calibrated in voltage to facilitate readings.

It is intended that all matter contained in the foregoing description and shown in the accompanying figures shall be taken as illustrative and not in a limiting sense.

What is claimed is:

1. An electrical stimulator for measuring muscle and nerve responses comprising, a pair of electronic tubes provided with control grids, said tubes having the plate electrodes thereof connected together and having the cathodes thereof connected together, a pair of electrode load terminals in the plate circuit of one of said tubes, means for generating a pair of inverted signals, said signals being applied to respective control grids of said tubes, a pair of similar in value cathode resistors series connected in the portion of the cathode circuit common to said pair of tubes, switch means for connecting and disconnecting one of said cathode resistors respectively into and out of said common cathode circuit, a direct current meter series connected in the portion of the plate circuit common to said pair of tubes, a third electronic tube having a control grid connected to the cathodes of said pair of tubes and also having a plate electrode, a variable negative voltage source connected to said control grid of said third tube, and a feedback circuit comprising a connection between said plate electrode of said third tube and each of the respective grids of said pair of tubes.

2. An electrical stimulator for measuring muscle and nerve responses comprising, a pair of electronic tubes provided with control grids and having plate electrodes and cathodes, said plate electrodes being connected together, said cathodes being connected together, load terminals in the plate circuit of one of said tubes for receiving load connections thereacross, means for generating a pair of inverted signals, each of said signals being applied to respective grids of said tubes, a cathode resistance in the portion of the cathode circuit common to both of said tubes, a third electronic tube having a control grid connected to the cathodes of said pair of tubes and also having a plate electrode, and a feedback circuit comprising a connection between the plate electrode of said third tube and each of the respective grids of said pair of tubes.

3. Apparatus as defined in claim 2 further including means for alternating the value of said cathode resistance whereby the value of said resistance is a predetermined fixed value in one instance and one-half of said fixed value as an alternate.

4. Apparatus as defined in claim 2 further including a variable source of negative grid bias applied to said control grid of said third tube.

5. Apparatus as defined in claim 2 further including indicating means responsive to current flow in the plate circuits of said pair of tubes.

6. Apparatus as defined in claim 2 further including means for establishing the value of said cathode resistance between a fixed predetermined value in one instance to an alternate value of one-half said predetermined value, and a variable source of negative grid bias applied to said control grid of said third tube.

7. Apparatus as defined in claim 2 further including means for establishing the value of said cathode resistance alternately between a fixed predetermined value and one-half of said value, a variable source of negative grid bias applied to the control grid of said third tube, and indicating means responsive to current flow in the plate circuit of said pair of tubes.

8. An electrical stimulator for measuring muscle and nerve responses comprising, a pair of electronic tubes provided with control grids, plate electrodes and cathodes, said plate electrodes being connected together, said cathodes being connected together, load terminals in the plate circuit of one of said tubes for receiving a patient load thereacross, an input terminal connected to each of said control grids for receiving a controlled signal impulse, a third electronic tube having a control grid connected to the cathodes of said pair of tubes, said third tube also having a plate electrode, and a feedback circuit comprising a connection between said plate electrode of said third tube and each of the respective grids of said pair of tubes.

9. Apparatus as defined in claim 8 further including a variable source of negative grid bias applied to said control grid of said third tube, and a cathode resistance in the portion of the cathode circuit common to said pair of tubes, said cathode resistance being connected to the cathodes of said pair of tubes.

10. Apparatus as defined in claim 8 further including a variable source of negative grid bias applied to said control grid of said third tube, and a variable cathode resistance in the portion of the cathode circuit common to said pair of tubes, said variable cathode resistance being connected to the cathodes of said pair of tubes.

11. Apparatus as defined in claim 8, further including a variable source of negative grid bias applied to said control grid of said third tube, a cathode resistance in the portion of the cathode circuit common to said pair of tubes, and means for varying said cathode resistance by a predetermined fixed value for effecting a change of current conducted by said pair of tubes by a predetermined increment.

12. A pulse generator comprising a pair of electronic tubes having control grids, plate electrodes and cathodes, the plate electrodes of said tubes being connected together to form a common plate circuit, the cathodes of said tubes being connected together to form a common cathode circuit, load terminals in series with the plate circuit of one of said tubes, and a third electronic tube having its control grid connected to the cathodes of said pair of tubes, said third tube also having a plate electrode connected to the respective control grids of said pair of tubes.

13. Apparatus as defined in claim 12, further including a variable source of negative grid bias applied to said control grid of said third tube, a variable cathode resistance in said common cathode circuit, and means for inserting a resistance element across said load, the resistance of said element being very low in comparison to the resistance of said load, whereby said generator provides a controlled voltage across said load.

14. A pulse generator comprising, a pair of current conducting elements responsive to a pair of inverted signals, means supplying respective ones of said signals to respective ones of said elements, said elements being connected in parallel relationship, load terminals for receiving a load in series with respect to only one of said elements, current sensitive means responsive to the currents conducted by said elements and producing a voltage proportional to said currents conducted by said elements, said current sensitive means being in a circuit common to said currents conducted by said elements, a variable source for supplying a voltage command signal, and a feedback circuit responsive to the comparison of the voltage produced by said current sensitive means with respect to said command signal voltage, said feedback circuit being coupled to said elements for supplying compensatory corrective signals to said elements dependent upon discrepancies between the compared voltages, whereby said elements conduct currents of predetermined amplitude and in desired proportion to said command signal voltage during periods of operation of each element.

15. Apparatus as defined in claim 14, further including means for varying said current sensitive means by a predetermined fixed value for effecting a change of said conducted currents by a predetermined increment.

16. A pulse generator comprising, a pair of electronic tubes having grids, said tubes also having plate electrodes connected together and cathodes connected together, means for connecting a load in series with respect to the plate circuit of only one of said tubes, current sensitive means in series with the common cathode circuit of both said tubes, said means being responsive to the currents conducted by said tubes and producing a voltage drop proportional to said conducted currents, a variable source for supplying a voltage command signal, and a signal amplifying feedback circuit responsive to the comparison of said voltage produced by said sensitive means with respect to said command signal for supplying compensatory corrective signals dependent upon discrepancies between the compared voltages to the respective grids of said tubes, whereby said tubes conduct current of equal magnitude during periods of operation of each of said tubes.

17. Apparatus as defined in claim 16 further including means for inserting a resistance element across said load, the resistance of said element being predeterminedly low in comparison to the resistance of said load, whereby said generator provides a controlled voltage across said load.

18. Apparatus as defined in claim 16, further including means for varying said current sensitive means by a predetermined fixed value for effecting a change of said conducted currents by a predetermined increment.

19. Apparatus as defined in claim 16, wherein a signal amplifying feedback circuit includes an electronic tube having grid and plate electrodes, said variable source includes a source of negative bias, said compared voltages being coupled to said grid of said signal amplifying tube, and said plate of said amplifying tube being coupled to respective grids of said pair of tubes.

No references cited.